July 3, 1934.  N. MILLER  1,964,766
FRUIT POLISHING MACHINE
Filed March 3, 1932  2 Sheets-Sheet 2
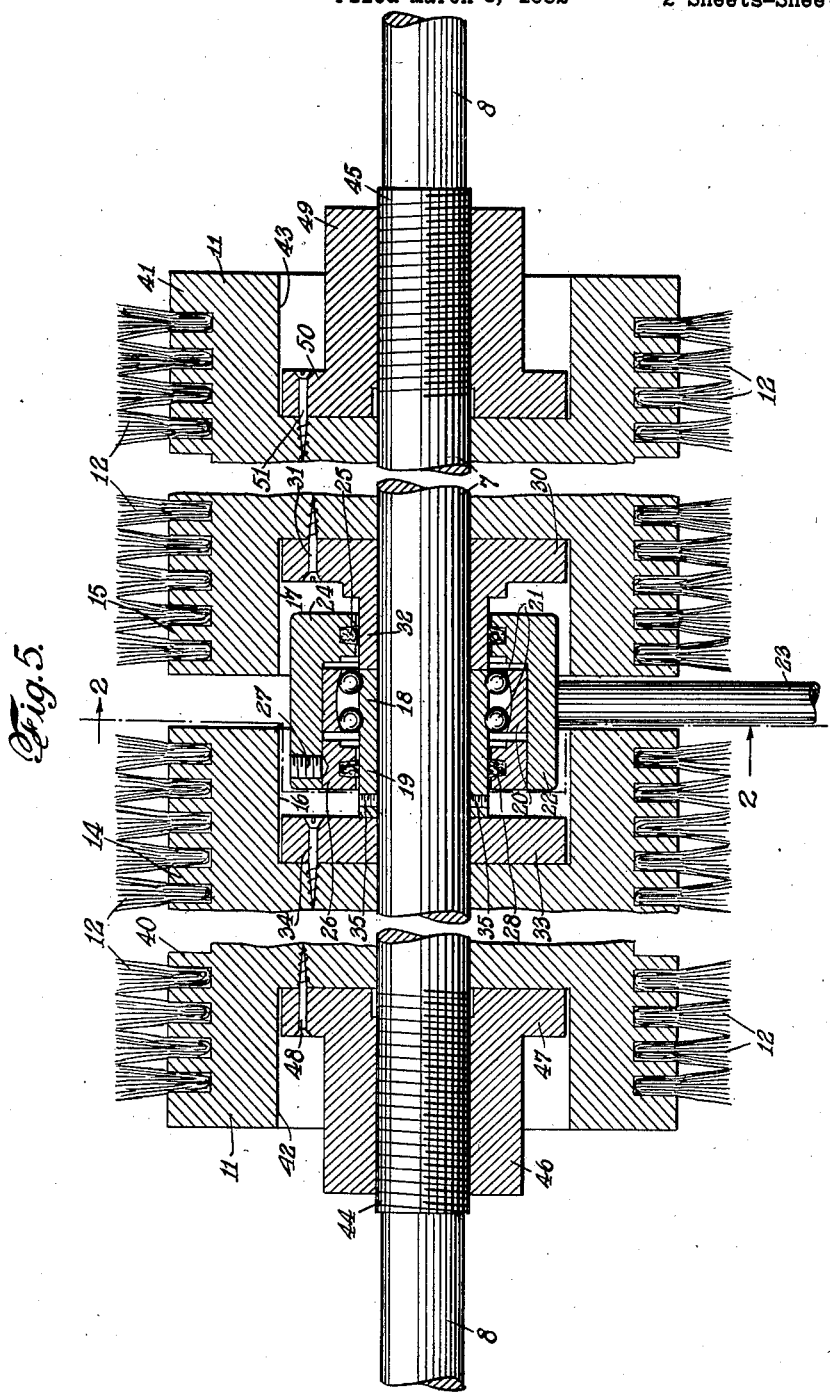
INVENTOR
NILS MILLER
BY
ATTORNEY Patented July 3, 1934

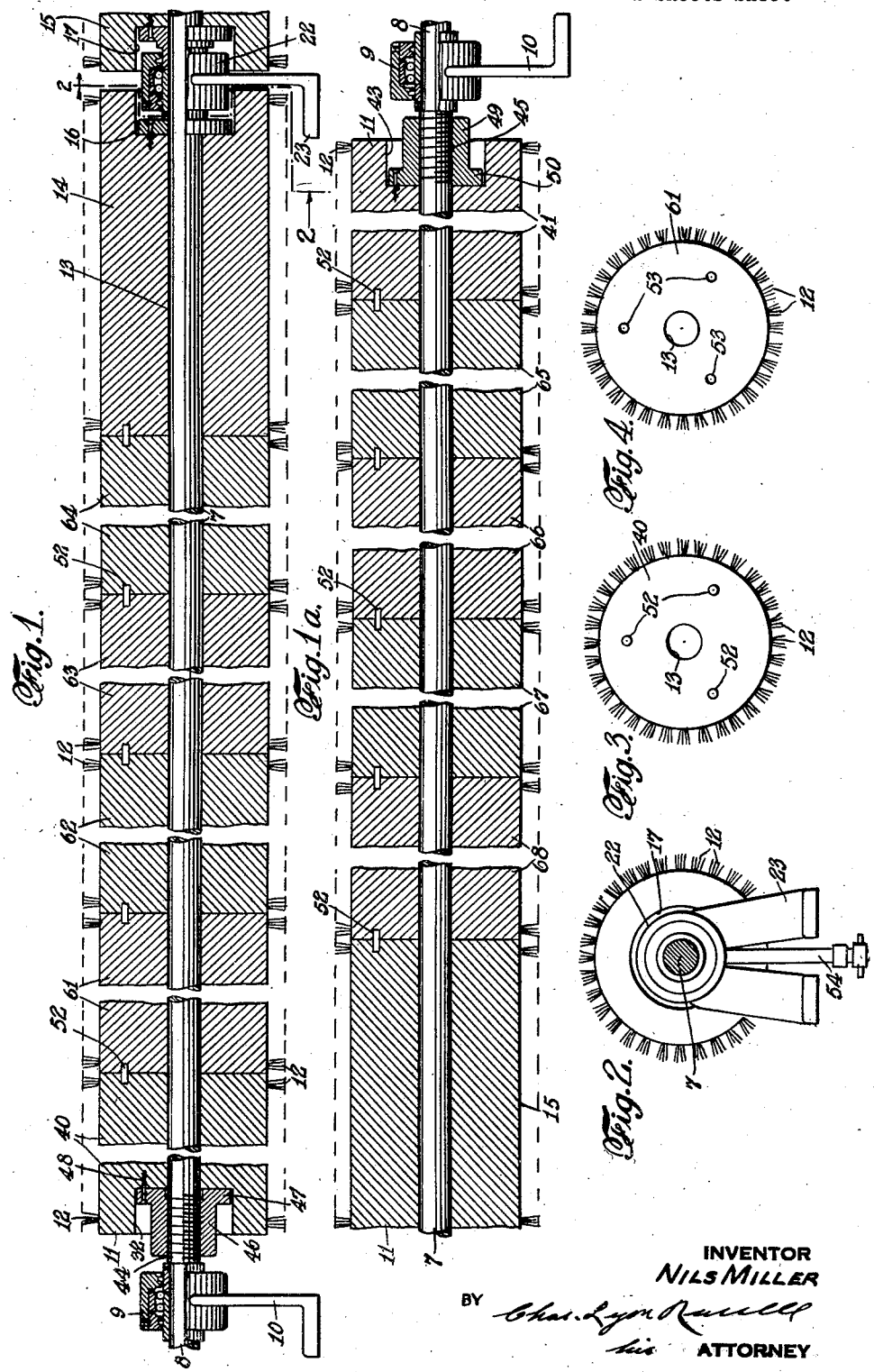

1,964,766

UNITED STATES PATENT OFFICE 1,964,766

FRUIT POLISHING MACHINE

Nils Miller, Atlanta, Ga., assignor, by mesne assignments, to S K F Industries, Inc., Philadelphia, Pa., a corporation of Delaware Application March 3, 1932, Serial No. 596,433

2 Claims. (Cl. 15—21)

This invention relates primarily to the mounting of the rotary brushes used in fruit washing and polishing machines, which machines are, at the present time, largely used in preparing citrous fruits for the market.

One of the objects of the invention is to provide a centrally disposed anti-friction bearing upon the shaft carrying the brushes and to secure the inner race of such bearing, preferably a ball bearing, to the shaft and to the adjacent brushes, and also to secure together all of the brushes upon the shaft.

Another object of the invention is to support the outer race of a bearing mounted upon the center portion of the shaft in such a manner that but a narrow space is left between the ends of the adjacent brushes.

Another object of the invention is to provide a mounting for a bearing between two adjacent brushes and for adequately supporting the housing for such bearing without encroaching unduly upon the continuity of the entire brush surface, and in such a manner that water and deleterious substances will be excluded from the housing and from the bearing, and also in such a manner that lubricant may be supplied to the bearing while the shaft is in operation.

Other objects of the invention and details of construction will be set forth and fully explained in the description which follows.

In the drawings I have illustrated my invention as applied to an existing form of brush showing such changes and modifications as are necessary to admit of the incorporation of my invention, in which drawings:

Figure 1 and Figure 1a show an elevation partly in section and partly broken through for shortening the length of the view of an existing form of brush having my invention incorporated therein.

Fig. 2 is a cross-section at about the line 2—2 of Figs. 1 and 5.

Figs. 3 and 4 are views of the respective ends of the intermediate brushes, and

Fig. 5 shows on a larger scale some of the parts represented in Figs. 1 and 1a.

A series of brushes, twelve in the present instance, which will be described in detail later on, are shown mounted upon a long, continuous shaft 7. This shaft has reduced ends 8 upon which are mounted ball bearings 9 supported in standards 10. The ends of the shaft outwardly of the bearing 9 are shown broken away. Some suitable driving connection will be mounted on one or both ends of the shaft for rotating it at the required speed and with the necessary power.

The brushes are shown as formed of cylindrical wooden bodies 11 furnished with a brush surface of cylindrical formation. In the illustration this surface is produced by a series of tufts 12. Each of the wooden bodies 11 has a center bore 13 with just sufficient clearance to permit the entrance of the shaft 7. The two center-most brushes, indicated by the reference characters 14 and 15, are shown counter-bored at 16 and 17 at the adjacent ends for forming a chamber within which the center bearing for the shaft 7 and its housing are mounted.

The series of brush sections when clamped together upon the shaft is much stiffer than the shaft alone and is almost as stiff as a solid brush would be.

The bearing illustrated is of the type known as an extended inner race ball bearing. The race ring of this bearing is shown having extended from its normal race carrying portion 18 an extension 19. The inner ring is shown secured to the shaft by set screws 35, to be described later. The outer race ring 20 of this bearing, which is shown to be of the two-row self-aligning character, affords a raceway for two ball sets 21. A housing 22 is provided for the bearing, it having a bore for receiving the outer race ring 20 of the bearing in accordance with the prevailing practice of mounting. The housing is shown supported by a standard 23 extending outwardly between the adjacent ends of the body of the brushes 14 and 15. This standard is of narrow formation so that the ends of these brushes may be located quite close together without danger of interference from the standard 23.

The housing 22 has at one side an integrally formed, inwardly directed flange 24, preferably formed with an oil sealing device 25. The other side of the housing is furnished with a closure ring 26 mounted in the bore of the housing and held in position preferably by means of a set screw 27. This closure ring is also furnished with an oil sealing device 28.

A collar 30 is shown mounted on the shaft within the counter-bore 17 and secured to the body portion 11 of the brush 15, wood screws 31 being shown in the present illustration. There is shown formed integrally with the collar an extension or sleeve 32 passing along the shaft 7 and engaging the normal end face of the ball bearing inner ring 18. A collar 33 is shown mounted on the shaft within the counter-bore 16 and secured to the body 11 of the brush 14, wood screws 34 being illustrated for this purpose.

The extension 19 of the inner ring of the bearing is shown extending from one end of the inner race ring proper 18 through the closure ring 26 and outwardly beyond this closure ring, and as having its free end in engagement with the collar 33. Preferably two set screws 35 pass through the sleeve 19 where this extends outwardly beyond the closure 26, which set screws are for the purpose of clamping the sleeve and the inner ring of the bearing to the shaft to compel such inner ring to rotate with the shaft. Means are provided for securing the outer-most ends of the end brushes to the shaft. These brushes are indicated by the reference characters 40, 41 respectively, and each is counter-bored as at 42, 43 respectively.

The portions of the shaft 7 which lie within these counter-bores are provided with screw threads, there being a left-hand screw thread 44 at the end of the shaft at the left-hand of the drawing and located within the counter-bore 42, and a right-hand thread 45 at the other end of the shaft and located within the counter-bore 43. These left and right-hand threads are for the purpose of cooperating with devices for clamping all the brushes intimately together.

Mounted upon the left-hand thread 44 is an elongated nut 46 also having a left-hand thread. This nut is preferably substantially cylindrical on its outer end for the application of a pipe wrench. The nut 46 also has formed integrally with it a collar 47 located within the counter-bore 42 and secured to the body of the brush, wood screws 48 being shown for that purpose. At the other end a similar nut 49 has screw threaded connection with the right-hand screw 45. It also has an integrally formed collar 50, wood screws 51 being shown in this instance also for securing the collar and the nut 49 to the body 11 of the brush 41.

All of the brushes of the set of twelve are practically the same, except for the fact that four of the brushes, namely the centrally located brushes 14 and 15 and the end brushes 40 and 41, are counter-bored. This leaves eight brushes which are not counter-bored. Reference characters have been applied to these brushes for purposes of identification, those located between the end brush 40 and the center brush 14 bearing the reference characters 61, 62, 63 and 64, and those between the outermost brush 41 and the center brush 15 bearing the reference characters 65, 66, 67 and 68. According to prevailing custom the brushes at each side are held together by means of dowel pins and sockets. The use of three dowel pins is found to give very satisfactory results. The inner end of the end brush 40 is shown furnished with three dowel pins 52 seated in sockets 53 in the adjacent ends of the brush 61. The brush 61 has dowel pins protruding from its inner end. In fact each of the eight intermediate brushes is formed at one end with dowel pins 52 and at the other end with sockets 53. The outer ends of the center-most brushes 14 and 15 are formed with sockets for receiving the dowel pins carried by the adjacent brushes 64 and 68 respectively. To accommodate this arrangement dowel pins 52 are carried by the inner end of the end brush 41.

The brushes and associated parts are conveniently mounted upon the shaft 7 in the following manner, the shaft being assumed to be free of its end bearings and end supports: The shaft 7 is passed through the bore 13 of the end brush 41. The nut 49 and collar 50 are screwed up to approximately their desired location on the right-hand screw thread 45. Then, or later as is desired, the collar 50 is secured to the body 11 of the brush by means of the wood screws 51. Then the intermediate brushes 65, 66, 67 and 68 are passed over the shaft 7, the various dowel pins being entered in their respective sockets. The brush 15 is then passed over the shaft in a like manner. This brush, however, carries with it practically the entire bearing assembly because before being threaded on the shaft the collar 30 has been fastened to the body 11 by means of the wood screws 31 and the housing 22 has had its inner closure flange 24 passed over the sleeve-like extension 32 of the collar 30. The ball bearing has been mounted in the housing; that is its outer race ring 20 has been mounted in the bore of the housing and the closure member 26 applied to the sleeve 19, such closure being secured in place by means of the set screws 27. If the center of the shaft 7 is the point from which the millwright is working the center of the housing 22 is located definitely at this point on the center of the shaft, whereupon the set screws 35 are tightened. The center brush 14 is then passed over the shaft, the collar 33 previously having been secured to it by means of the wood screws 34. This collar then comes in engagement with the extending end of the sleeve 19. The brushes 64, 63, 62 and 61 are then passed over the shaft and finally the brush 40 is passed over. Then the nut 46 carrying the integral collar 47 is screwed up on the left-hand screw thread 44 in cooperation with the tightening of the right-hand nut 49 until the parts including the centrally disposed bearings are brought into intimate and binding assembly. Thereupon the wood screws 48 are passed through the collar 47 and into the body 11 of the brush 40. The collar 50 may also be secured to its brush 41 by screws 51 at this time. The shaft, with its complement of brushes, is then in condition to be mounted in the washing or polishing machine by having applied to its ends the ball bearings 9 which are received by the housings in the standards 10.

As a convenient means for supplying lubricant within the housing 22 for protecting the central bearing a lubricating system 54 is shown supported by the standard 23 and extending within the housing 22.

Having thus described my invention, what I claim and desire to secure by Letters Patent is:

1. A device of the character specified embodying a shaft and a plurality of cylindrical brush sections mounted thereon, each brush section comprising a body portion surrounded by bristles and having a longitudinal shaft receiving bore, an anti-friction bearing having its inner race ring mounted on the shaft between two of the intermediate brush sections, a support for the outer race ring of such bearing, means for connecting the end brush sections with the respective intermediate sections, and means for securing the end sections to the shaft and active inwardly upon the outer ends of the end section for clamping the said inner race ring between the said two intermediate sections and for clamping the sections in intimate relation.

2. A device of the character specified embodying a shaft, bearings for supporting the ends of the shaft, and a plurality of cylindrical brushes mounted thereon, each brush comprising a wooden body portion surrounded by bristles and having a longitudinal shaft receiving bore, an antifriction bearing having its inner race ring mounted on the shaft between two of the intermediate brushes, a support for the outer race ring of such bearing, dowel pins connecting the wooden body portions of the end brushes with the wooden body portions of the respective intermediate brushes, and means for securing the end brushes to the shaft and active inwardly upon the outer ends of the end brushes for clamping said inner race ring between the said two intermediate brushes and for clamping all the brushes in intimate relation.

NILS MILLER.